(12) United States Patent
Guyan et al.

(10) Patent No.: US 10,575,586 B2
(45) Date of Patent: *Mar. 3, 2020

(54) SHOE WITH LATTICE STRUCTURE

(71) Applicant: Under Armour, Inc., Baltimore, MD (US)

(72) Inventors: Alan Guyan, Baltimore, MD (US);
Jason Berns, Baltimore, MD (US);
Kevin Fallon, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,912

(22) Filed: Oct. 30, 2017

(65) Prior Publication Data

US 2018/0049514 A1 Feb. 22, 2018

Related U.S. Application Data

(63) Continuation of application No. 15/067,250, filed on Mar. 11, 2016, which is a continuation of application
(Continued)

(51) Int. Cl.
*A43B 13/18* (2006.01)
*A43B 13/04* (2006.01)
(Continued)

(52) U.S. Cl.
CPC ............. *A43B 13/181* (2013.01); *A43B 13/12* (2013.01); *A43B 13/125* (2013.01);
(Continued)

(58) Field of Classification Search
CPC ............................................. A43B 13/12–181
See application file for complete search history.

(56) References Cited

U.S. PATENT DOCUMENTS 1,800,406 A 4/1931 De Blois Rice
1,887,026 A 11/1932 Lach
(Continued)

FOREIGN PATENT DOCUMENTS

AU 2008-207351 A1 3/2009
AU 2008207351 3/2009
(Continued)

OTHER PUBLICATIONS

Elkins, Kurt et al. "Soft Elastomers for Fused Deposition Modeling," Solid Freeform Fabrication Proceedings, Sep. 1997, pp. 441-448.
(Continued)

*Primary Examiner* — Jila M Mohandesi
(74) *Attorney, Agent, or Firm* — Maginot, Moore & Beck LLP

(57) ABSTRACT

An article of footwear includes an upper, a midsole connected to the upper, and an outsole connected to the midsole. The midsole includes a lattice structure comprising a network of laths forming a plurality of cell units, the plurality of cell units arranged in a plurality of layers on the midsole. The midsole defines at least a first zone and a second zone wherein each cell unit in the first zone has a physical property that is substantially different from a cell unit in the second zone.

19 Claims, 12 Drawing Sheets

Related U.S. Application Data

No. 13/829,624, filed on Mar. 14, 2013, now Pat. No. 9,320,316.

(51) Int. Cl.
  *A43B 13/12* (2006.01)
  *B29C 64/112* (2017.01)
  *A43B 13/14* (2006.01)
  *B29C 64/10* (2017.01)
  *B33Y 10/00* (2015.01)

(52) U.S. Cl.
  CPC ............ *A43B 13/127* (2013.01); *A43B 13/14* (2013.01); *B29C 64/10* (2017.08); *B29C 64/112* (2017.08); *A43D 2200/60* (2013.01); *B33Y 10/00* (2014.12)

(56) References Cited

U.S. PATENT DOCUMENTS

| | | |
|---|---|---|
| 2,288,388 A | 6/1942 | Bolten et al. |
| 3,253,601 A | 5/1966 | Scholl |
| 3,256,621 A | 6/1966 | Linton |
| 3,469,576 A | 9/1969 | Smith et al. |
| 3,921,313 A | 11/1975 | Mahide et al. |
| 4,134,955 A | 1/1979 | Hanrahan, Jr. |
| 4,168,341 A | 9/1979 | Siedenstrang et al. |
| 4,170,078 A | 10/1979 | Moss |
| 4,219,945 A | 9/1980 | Rudy |
| 4,245,406 A | 1/1981 | Landay |
| 4,297,796 A | 11/1981 | Stirtz et al. |
| 4,316,335 A | 2/1982 | Giese |
| D273,246 S | 4/1984 | Tonkel |
| 4,535,553 A | 8/1985 | Derderian et al. |
| 4,546,556 A | 10/1985 | Stubblefield |
| 4,551,930 A | 11/1985 | Graham et al. |
| 4,594,799 A | 6/1986 | Lin |
| 4,598,487 A | 7/1986 | Misevich |
| 4,663,865 A | 5/1987 | Telecemian |
| 4,668,557 A | 5/1987 | Lakes |
| 4,769,927 A | 9/1988 | Liggett et al. |
| 4,774,774 A | 10/1988 | Allen |
| 4,845,863 A | 7/1989 | Yung-Mao |
| 4,854,055 A | 8/1989 | Sugiyama |
| 4,863,538 A | 9/1989 | Deckard |
| 4,864,738 A | 9/1989 | Horovitz |
| 4,938,816 A | 7/1990 | Beaman et al. |
| 4,968,816 A | 11/1990 | Imaki et al. |
| 4,970,807 A * | 11/1990 | Anderie ............... A43B 1/0072 36/28 |
| 5,005,575 A | 4/1991 | Geri |
| 5,022,168 A | 6/1991 | Jeppson, III et al. |
| 5,117,566 A | 6/1992 | Lloyd |
| 5,156,697 A | 10/1992 | Bourell et al. |
| D330,628 S * | 11/1992 | Frachey .......................... D2/968 |
| 5,174,049 A * | 12/1992 | Flemming ............ A43B 1/0009 36/28 |
| 5,218,773 A | 6/1993 | Beekman |
| 5,231,776 A | 8/1993 | Wagner |
| 5,233,767 A | 8/1993 | Kramer |
| 5,255,451 A | 10/1993 | Tong et al. |
| 5,261,169 A | 11/1993 | Williford |
| 5,311,674 A * | 5/1994 | Santiyanont ........... A43B 21/26 36/28 |
| 5,313,717 A | 5/1994 | Allen et al. |
| 5,337,492 A * | 8/1994 | Anderie ............... A43B 13/181 36/114 |
| 5,348,693 A | 9/1994 | Taylor et al. |
| D351,277 S * | 10/1994 | Aveni ............................ D2/961 |
| 5,353,526 A * | 10/1994 | Foley .................. A43B 1/0009 36/35 R |
| 5,367,791 A | 11/1994 | Gross et al. |
| 5,372,487 A | 12/1994 | Pekar |
| 5,408,761 A | 4/1995 | Gazzano |
| 5,421,050 A | 6/1995 | Laganas |
| 5,461,800 A | 10/1995 | Luthi et al. |
| 5,465,509 A | 11/1995 | Fuerst et al. |
| 5,511,323 A | 4/1996 | Dahlgren |
| 5,588,900 A | 12/1996 | Urakami |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,167 A | 11/1997 | Rudy |
| 5,686,781 A | 11/1997 | Bury |
| 5,718,063 A | 2/1998 | Yamashita et al. |
| 5,771,610 A | 6/1998 | McDonald |
| 5,785,909 A | 7/1998 | Chang |
| 5,822,886 A | 10/1998 | Luthi |
| 5,876,767 A | 3/1999 | Mattes et al. |
| 5,896,680 A | 4/1999 | Kim et al. |
| 5,908,569 A | 6/1999 | Wilkening et al. |
| 5,918,383 A | 7/1999 | Chee |
| 5,930,916 A | 8/1999 | Connor |
| 5,979,078 A | 11/1999 | McLaughlin |
| 5,983,524 A | 11/1999 | Polegato |
| 5,987,780 A | 11/1999 | Lyden et al. |
| 5,987,781 A | 11/1999 | Pavesi et al. |
| 6,006,412 A | 12/1999 | Bergmann et al. |
| 6,014,821 A | 1/2000 | Yaw |
| 6,029,376 A | 2/2000 | Cass |
| 6,061,929 A | 5/2000 | Ritter |
| 6,098,313 A | 8/2000 | Skaja |
| 6,108,943 A | 8/2000 | Hudson et al. |
| 6,110,411 A | 8/2000 | Clausen et al. |
| 6,180,943 B1 | 1/2001 | Lange |
| 6,193,923 B1 | 2/2001 | Leyden et al. |
| 6,195,914 B1 | 3/2001 | Otis |
| 6,205,682 B1 | 3/2001 | Park |
| 6,259,962 B1 | 7/2001 | Gothait |
| 6,338,768 B1 | 1/2002 | Chi |
| 6,360,454 B1 | 3/2002 | Dachguber et al. |
| 6,367,172 B2 * | 4/2002 | Hernandez ........... A43B 1/0009 36/103 |
| 6,412,196 B1 | 7/2002 | Gross |
| 6,476,122 B1 | 11/2002 | Leyden |
| 6,533,885 B2 | 3/2003 | Davis et al. |
| 6,540,864 B1 | 4/2003 | Chi |
| 6,558,784 B1 | 5/2003 | Norton et al. |
| 6,574,523 B1 | 6/2003 | Hanna et al. |
| 6,589,630 B1 | 7/2003 | Crow |
| 6,601,042 B1 | 7/2003 | Lyden |
| 6,601,321 B1 | 8/2003 | Kendall |
| 6,660,209 B2 | 12/2003 | Leyden et al. |
| 6,694,207 B2 | 2/2004 | Darrah et al. |
| 6,763,611 B1 | 7/2004 | Fusco |
| 6,769,202 B1 | 8/2004 | Luthi et al. |
| 6,817,112 B2 | 11/2004 | Berger |
| 6,819,966 B1 | 11/2004 | Haeberli |
| 6,826,852 B2 | 12/2004 | Fusco |
| 6,931,764 B2 | 8/2005 | Swigart et al. |
| 6,944,975 B2 | 9/2005 | Safdeye et al. |
| 6,971,193 B1 | 12/2005 | Potter et al. |
| 6,994,913 B1 | 2/2006 | Niki |
| 7,065,820 B2 | 6/2006 | Meschter |
| 7,077,638 B2 | 7/2006 | Leyden et al. |
| 7,080,467 B2 | 7/2006 | Marvin et al. |
| RE39,354 E | 10/2006 | Dickens, Jr. et al. |
| 7,131,218 B2 | 11/2006 | Schindler |
| 7,148,266 B2 | 12/2006 | Nesbitt et al. |
| 7,148,286 B2 | 12/2006 | Baumann et al. |
| 7,159,338 B2 | 1/2007 | LeVert |
| 7,171,765 B2 | 2/2007 | Lo |
| 7,200,955 B2 | 4/2007 | Foxen |
| 7,207,125 B2 | 4/2007 | Jeppesen et al. |
| 7,236,166 B2 | 6/2007 | Zinniel et al. |
| 7,291,002 B2 | 11/2007 | Russell et al. |
| 7,350,320 B2 | 4/2008 | Chandler |
| 7,350,321 B2 | 4/2008 | Soon et al. |
| 7,383,647 B2 | 6/2008 | Chan |
| 7,398,608 B2 | 7/2008 | Schoenborn |
| 7,424,783 B2 | 9/2008 | Meschter et al. |
| 7,467,484 B2 | 12/2008 | Chang et al. |
| 7,484,318 B2 | 2/2009 | Finkelstein |

(56) References Cited

U.S. PATENT DOCUMENTS

| | | |
|---|---|---|
| 7,571,556 B2 | 8/2009 | Hardy et al. |
| 7,636,974 B2 | 12/2009 | Meschter et al. |
| 7,707,743 B2 | 5/2010 | Schindler |
| 7,779,558 B2 | 8/2010 | Nishiwaki et al. |
| 7,788,827 B2 | 9/2010 | Fogg et al. |
| 7,805,859 B2 | 10/2010 | Finkelstein |
| 7,886,461 B2 | 2/2011 | Sato |
| 8,056,263 B2 | 11/2011 | Schindler |
| 8,356,429 B2 * | 1/2013 | Eder .................. A43B 5/02 36/114 |
| 8,522,454 B2 | 9/2013 | Schindler |
| 8,739,639 B2 | 6/2014 | Owings et al. |
| 8,776,396 B2 | 7/2014 | Huynh |
| 8,914,998 B2 | 12/2014 | Gheorghian et al. |
| 9,320,316 B2 | 4/2016 | Guyan et al. |
| 9,453,142 B2 | 9/2016 | Rolland et al. |
| 9,504,289 B2 | 11/2016 | Dojan et al. |
| 9,510,635 B2 | 12/2016 | Dojan et al. |
| 9,572,402 B2 | 2/2017 | Jarvis |
| 9,788,600 B2 | 10/2017 | Wawrousek |
| 10,010,133 B2 | 7/2018 | Guyan |
| 10,039,343 B2 | 8/2018 | Guyan |
| 2001/0001904 A1* | 5/2001 | Hernadez ............ A43B 1/0009 36/28 |
| 2001/0032399 A1 | 10/2001 | Litchfield et al. |
| 2001/0036516 A1 | 11/2001 | Schmidt |
| 2002/0023306 A1 | 2/2002 | Sajedi et al. |
| 2003/0009919 A1 | 1/2003 | Stein |
| 2003/0051372 A1 | 3/2003 | Lyden |
| 2003/0069807 A1 | 4/2003 | Lyden |
| 2003/0127436 A1 | 7/2003 | Darrah |
| 2003/0172548 A1 | 9/2003 | Fuerst |
| 2003/0183324 A1 | 10/2003 | Tawney |
| 2003/0191554 A1 | 10/2003 | Russell et al. |
| 2003/0233771 A1 | 12/2003 | Soon et al. |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0159014 A1 | 8/2004 | Sommer |
| 2004/0168329 A1 | 9/2004 | Ishimaru |
| 2004/0221482 A1 | 11/2004 | Berger et al. |
| 2004/0261295 A1 | 12/2004 | Meschter |
| 2005/0000116 A1 | 1/2005 | Snow |
| 2005/0017393 A1 | 1/2005 | Stockwell |
| 2005/0039346 A1 | 2/2005 | Thomas et al. |
| 2005/0076536 A1 | 4/2005 | Hatfield et al. |
| 2005/0126038 A1 | 6/2005 | Skaja et al. |
| 2005/0151302 A1 | 7/2005 | Latos et al. |
| 2005/0188564 A1 | 9/2005 | Delgorgue et al. |
| 2005/0262739 A1 | 12/2005 | McDonald et al. |
| 2005/0268497 A1 | 12/2005 | Alfaro et al. |
| 2005/0282454 A1 | 12/2005 | Meschter et al. |
| 2006/0052892 A1 | 3/2006 | Matsushima et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanagh et al. |
| 2006/0112594 A1 | 6/2006 | Kilgore |
| 2006/0119012 A1 | 6/2006 | Ruatta et al. |
| 2006/0143839 A1 | 7/2006 | Fromme |
| 2006/0155417 A1 | 7/2006 | Cremaschi et al. |
| 2006/0201028 A1* | 9/2006 | Chan .................... A43B 7/142 36/28 |
| 2006/0254087 A1 | 11/2006 | Fechter |
| 2006/0283044 A1 | 12/2006 | Lacey |
| 2007/0016323 A1 | 1/2007 | Fried |
| 2007/0022631 A1 | 2/2007 | Ho |
| 2007/0039204 A1* | 2/2007 | Wyszynski .......... A43B 13/181 36/28 |
| 2007/0044345 A1 | 3/2007 | Yang |
| 2007/0045891 A1 | 3/2007 | Martinoni et al. |
| 2007/0056188 A1 | 3/2007 | Tsai |
| 2007/0119074 A1 | 5/2007 | Aveni et al. |
| 2007/0163147 A1 | 7/2007 | Cavanagh et al. |
| 2007/0182070 A1 | 8/2007 | Monsheimer et al. |
| 2007/0227041 A1 | 10/2007 | Menghini |
| 2007/0232753 A1 | 10/2007 | Monsheimer et al. |
| 2007/0240333 A1 | 10/2007 | Le et al. |
| 2007/0277401 A1 | 12/2007 | Young-Chul |
| 2008/0060221 A1 | 3/2008 | Hottinger |
| 2008/0115389 A1* | 5/2008 | Hsieh .................. A43B 13/181 36/30 A |
| 2008/0155855 A1 | 7/2008 | Klavano |
| 2008/0215176 A1 | 9/2008 | Borovinskih et al. |
| 2008/0250673 A1* | 10/2008 | Andrews ............... A43B 13/12 36/25 R |
| 2008/0289218 A1 | 11/2008 | Nakano |
| 2009/0012622 A1 | 1/2009 | James |
| 2009/0014424 A1 | 1/2009 | Meschter |
| 2009/0072436 A1 | 3/2009 | Dean |
| 2009/0073162 A1 | 3/2009 | Waatti |
| 2009/0118040 A1 | 5/2009 | DeGaravilla |
| 2009/0126225 A1 | 5/2009 | Jarvis |
| 2009/0145005 A1 | 6/2009 | Murphy et al. |
| 2009/0199437 A1 | 8/2009 | Pavkovic |
| 2009/0211119 A1 | 8/2009 | Moretti |
| 2009/0316965 A1 | 12/2009 | Mailling et al. |
| 2010/0050480 A1 | 3/2010 | Moretti |
| 2010/0229430 A1 | 9/2010 | Berger et al. |
| 2011/0046253 A1 | 2/2011 | Bowen |
| 2011/0252664 A1 | 10/2011 | Jennings |
| 2011/0258883 A1* | 10/2011 | Eder .................. A43B 5/02 36/133 |
| 2011/0265352 A1 | 11/2011 | Lin |
| 2011/0277349 A1* | 11/2011 | Kim ................... A43B 3/0005 36/84 |
| 2012/0011782 A1 | 1/2012 | Kolås |
| 2012/0055043 A1 | 3/2012 | Schindler |
| 2012/0117825 A9 | 5/2012 | Jarvis |
| 2012/0180341 A1 | 7/2012 | Crowley |
| 2013/0074363 A1 | 3/2013 | Adams |
| 2013/0125416 A1 | 5/2013 | Hoffer |
| 2014/0002019 A1 | 1/2014 | Park |
| 2014/0002677 A1 | 1/2014 | Schinker |
| 2014/0002903 A1 | 1/2014 | Shim |
| 2014/0020191 A1 | 1/2014 | Jones et al. |
| 2014/0025978 A1 | 1/2014 | Tokunaga |
| 2014/0026773 A1 | 1/2014 | Miller |
| 2014/0029030 A1 | 1/2014 | Miller |
| 2014/0029900 A1 | 1/2014 | Logan |
| 2014/0030067 A1 | 1/2014 | Kim |
| 2014/0109440 A1 | 4/2014 | McDowell |
| 2014/0109441 A1 | 4/2014 | McDowell et al. |
| 2014/0115920 A1 | 5/2014 | McCue |
| 2014/0182170 A1 | 7/2014 | Wawrousek |
| 2014/0223783 A1 | 8/2014 | Wardlaw et al. |
| 2014/0226773 A1 | 8/2014 | Toth et al. |
| 2014/0259787 A1 | 9/2014 | Guyan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2015/0033581 A1 | 2/2015 | Barnes et al. |
| 2015/0128448 A1 | 5/2015 | Lockyer |
| 2015/0193559 A1 | 7/2015 | Musuvathy |
| 2015/0223560 A1 | 8/2015 | Wawrousek et al. |
| 2015/0351493 A1 | 12/2015 | Ashcroft et al. |
| 2016/0051009 A1 | 2/2016 | Kormann |
| 2016/0095385 A1 | 4/2016 | Nordstrom |
| 2016/0113352 A1 | 4/2016 | Guyan |
| 2016/0122493 A1 | 5/2016 | Farris |
| 2016/0137839 A1 | 5/2016 | Rolland et al. |
| 2016/0160077 A1 | 6/2016 | Rolland et al. |
| 2016/0180440 A1 | 6/2016 | Dibenedetto et al. |
| 2016/0192740 A1 | 7/2016 | Guyan |
| 2016/0219976 A1 | 8/2016 | Guyan |
| 2016/0242502 A1 | 8/2016 | Spanks |
| 2016/0324260 A1 | 11/2016 | Guyan |
| 2016/0324261 A1 | 11/2016 | Guyan |
| 2016/0325520 A1 | 11/2016 | Berger |
| 2016/0374428 A1 | 12/2016 | Kormann |
| 2017/0136689 A1 | 5/2017 | Jarvis |

(56) References Cited

U.S. PATENT DOCUMENTS

| | | |
|---|---|---|
| 2017/0181496 A1 | 6/2017 | Guyan |
| 2017/0224053 A1 | 8/2017 | Truelsen |
| 2017/0231322 A1 | 8/2017 | Gheorghian |
| 2017/0332733 A1 | 11/2017 | Cluckers |
| 2018/0008004 A1 | 1/2018 | Guyan |
| 2018/0043805 A1 | 2/2018 | Baek |
| 2018/0070736 A1 | 3/2018 | Achten |
| 2018/0071979 A1 | 3/2018 | Achten |

FOREIGN PATENT DOCUMENTS

| | | |
|---|---|---|
| CN | 2048682 U | 12/1989 |
| CN | 11-90560 A | 8/1998 |
| CN | 1190560 | 8/1998 |
| CN | 23-57543 Y | 1/2000 |
| CN | 2357543 | 1/2000 |
| CN | 12-52344 A | 5/2000 |
| CN | 1252344 | 5/2000 |
| CN | 1255887 A | 6/2000 |
| CN | 1342046 A | 3/2002 |
| CN | 1348731 A | 5/2002 |
| CN | 26-76682 Y | 2/2005 |
| CN | 2676682 | 2/2005 |
| CN | 1638662 A | 7/2005 |
| CN | 1638663 A | 7/2005 |
| CN | 2827065 Y | 10/2006 |
| CN | 1871964 A | 12/2006 |
| CN | 1871965 A | 12/2006 |
| CN | 2857548 Y | 1/2007 |
| CN | 101161151 A | 4/2008 |
| CN | 101388119 A | 3/2009 |
| CN | 101611953 A | 12/2009 |
| CN | 102578760 A | 7/2012 |
| CN | 203378623 U | 1/2014 |
| DE | 20 2004 018 209 U1 | 1/2005 |
| DE | 202004018209 | 1/2005 |
| DE | 10 2005 023 473 A1 | 11/2006 |
| DE | 102005023473 | 11/2006 |
| DE | 10 2006 025 990 A1 | 12/2006 |
| EP | 0526892 A2 | 10/1993 |
| EP | 1 206 915 A2 | 5/2002 |
| EP | 1 346 655 A1 | 9/2003 |
| EP | 1 354 528 A1 | 10/2003 |
| EP | 2564719 A1 | 6/2013 |
| EP | 2424398 B1 | 12/2015 |
| ES | 2442448 A1 | 2/2014 |
| ES | 2578730 A1 | 7/2016 |
| GB | 1 375 665 A | 11/1974 |
| GB | 2188531 A | 10/1987 |
| GB | 2 434 541 A | 8/2007 |
| JP | S44-19087 Y1 | 8/1969 |
| JP | S56-92503 U | 7/1981 |
| JP | S60-180511 U | 11/1985 |
| JP | H02107304 U | 8/1990 |
| JP | H03-198801 | 8/1991 |
| JP | H04-43109 U | 4/1992 |
| JP | H04-505107 A | 9/1992 |
| JP | H065506 U | 1/1994 |
| JP | 07-007766 Y | 3/1995 |
| JP | H07030709 U | 6/1995 |
| JP | 3015346 U | 8/1995 |
| JP | 08-197652 | 8/1996 |
| JP | H0910011 A | 1/1997 |
| JP | 09-057874 | 3/1997 |
| JP | H0957874 | 3/1997 |
| JP | H09123315 | 5/1997 |
| JP | 09/277384 A | 10/1997 |
| JP | H09-277384 A | 10/1997 |
| JP | 10-240964 | 9/1998 |
| JP | H10-240964 | 9/1998 |
| JP | 2000-152801 A | 6/2000 |
| JP | 2002-001827 A | 1/2002 |
| JP | 03-316462 B2 | 8/2002 |
| JP | 2003093103 A | 4/2003 |
| JP | 2004-042545 A | 2/2004 |
| JP | 3107284 U | 1/2005 |
| JP | 2006-072837 A | 3/2006 |
| JP | 2006-265545 A | 10/2006 |
| JP | 2006-334400 A | 12/2006 |
| JP | 2007-522908 A | 8/2007 |
| JP | 2008-513252 A | 5/2008 |
| JP | 2008-517795 A | 5/2008 |
| JP | 2009-045244 A | 3/2009 |
| JP | 2014151201 A | 8/2014 |
| JP | 3192899 U | 9/2014 |
| KR | 1019940003504 | 3/1994 |
| KR | 20-0412036 Y1 | 3/2006 |
| WO | 0053398 | 9/2000 |
| WO | 0053398 A1 | 9/2000 |
| WO | 2001024575 | 4/2001 |
| WO | 03-082550 A2 | 10/2003 |
| WO | 2006122832 A2 | 11/2003 |
| WO | 2004018966 | 3/2004 |
| WO | 2004073416 | 9/2004 |
| WO | 2004092346 | 10/2004 |
| WO | 2005-063071 A2 | 7/2005 |
| WO | 2006-034261 A2 | 3/2006 |
| WO | 2006034012 A2 | 3/2006 |
| WO | 2006034261 | 3/2006 |
| WO | 2006038338 A1 | 4/2006 |
| WO | 2006047259 | 5/2006 |
| WO | 2006098715 A1 | 9/2006 |
| WO | 2008010855 | 1/2008 |
| WO | 2009-035831 A1 | 3/2009 |
| WO | 2009035831 | 3/2009 |
| WO | 2009114715 | 3/2009 |
| WO | 2009055451 | 4/2009 |
| WO | 2009055451 A1 | 4/2009 |
| WO | 2009086520 | 7/2009 |
| WO | 2009-114715 A2 | 9/2009 |
| WO | 2010126708 A2 | 11/2010 |
| WO | 2014008331 A2 | 1/2014 |
| WO | 2014009587 | 1/2014 |
| WO | 2014015037 A2 | 1/2014 |
| WO | 2014100462 A1 | 6/2014 |
| WO | 2015169941 A1 | 11/2015 |
| WO | 2015169942 A1 | 11/2015 |
| WO | 2016066750 A1 | 5/2016 |

OTHER PUBLICATIONS

Zhang, Yu, Mechanical Property of Fused Deposition Parts, Graduate Thesis, Lehigh University, 2002.

Wohlers, Terry, The World of Rapid Prototyping, Proceedings of the Fourth International Conference on Desktop Manufacturing, Sep. 1992, San Jose, CA.

Major RP Technologies, https://uni.edu/~rao/rt.major_tech.htm.

Adidas Breaks the Mould with 3D-Printed Performance Footwear, Adidas Group, Oct. 2015.

Z-Corporation, "Z Corporation 3D Printing Technology", available at http://www.zcorp.com/documents/108_3D%20Printing%20White%20Paper%20FINAL.pdf, 2005, 7 pages.

Graham-Rowe, Duncan, "Tailor-printed shoes will offer a perfect fit", New Scientist, Feb. 11, 2006, pp. 30, vol. 189, Issue 2538.

Piller, Frank, "Footwear Customization 3.0: The First Rapid Manufactured Shoe", Mass Customization & Open Innovation News, at http://mass-customization.blogs.com/mass_customization_open_i/2006/10/footwear_custom.html, Oct. 24, 2006, 4 pages.

Loughborough University, "World's first fully customised football boot accelerated by Rapid Manufacturing experts," Apr. 2006.

Mass Customization & Open Innovation News, "Priot 2 Lever: Footwear Customization With Rapid Manufacturing", downloaded from <http://mass-customization.de/2006/04/prior_2_lever_f.html>, Apr. 2006.

J.P. Kruth et al. "Consolidation of Polymer Powders by Selective Laser Stintering," 3rd International Conference PMI2008, 2008, pp. 1-16, Ghent, Belgium.

* cited by examiner

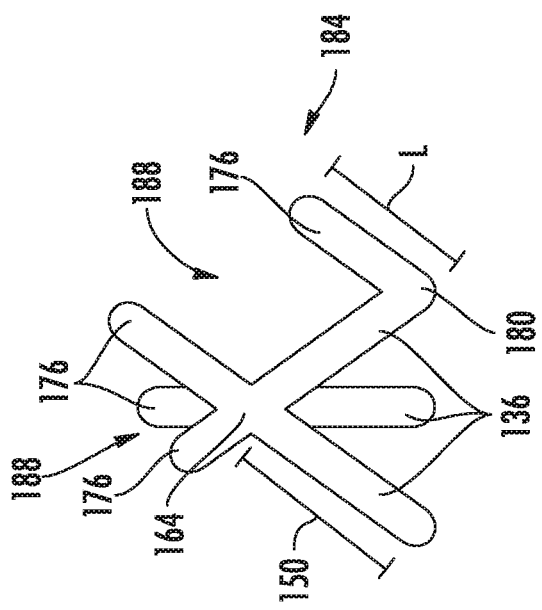
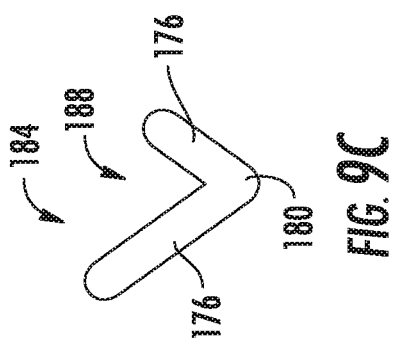
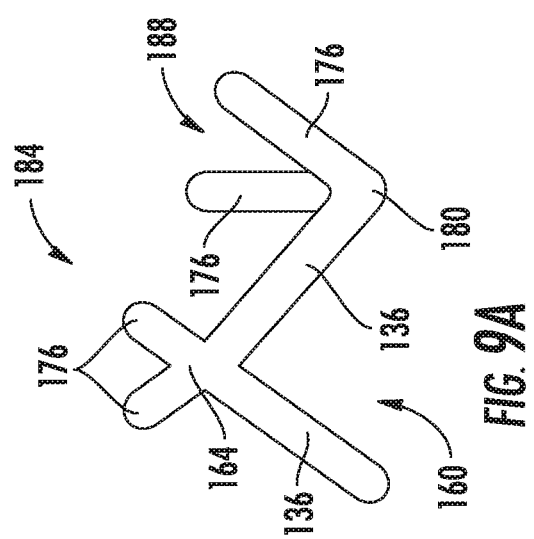

SHOE WITH LATTICE STRUCTURE

CROSS-REFERENCE TO RELATED APPLICATIONS

This patent document is a continuation of and claims priority from U.S. patent application Ser. No. 15/067,250, filed Mar. 11, 2016, which is a continuation of and claims priority from U.S. patent application Ser. No. 13/829,624, filed Mar. 14, 2013, the contents of which are incorporated herein by reference in their entirety.

FIELD

This disclosure relates generally to shoes and specifically to support arrangements for shoe soles, and methods of making the same.

BACKGROUND

FIG. 1 shows a shoe 10 to be worn on a foot of a user with a portion of the shoe 10 cut away so that the inside of the shoe 10 is partially visible. The shoe 10 includes an upper 14 and a sole 18 coupled to the upper 14. The upper 14 covers the top and sides of the user's foot, and the sole 18 covers the bottom of the user's foot and makes contact with the ground. The sole 18 typically includes an insole 22, a midsole 26, and an outsole 30 which cushion and protect the user's foot while the user makes contact with the ground. The insole 22 contacts the user's foot, the outsole 30 contacts the ground, and the midsole 26 is arranged between the insole 22 and the outsole 30. The insole 22 generally provides a comfortable surface for contact with the user's foot and is typically essentially comprised of a thin layer of a man-made material such as, for example, ethylene vinyl acetate. The midsole 26 generally provides most of the cushioning and shock absorption for the foot of the user and is typically essentially comprised of a polymer such as, for example, polyurethane, surrounding another material such as, for example, a foam, a gel, or capsules filled with air. The outsole 30 generally provides a durable surface which can sustain repeated impact and friction with the ground and is typically essentially comprised of a rubber such as, for example, carbon rubber or blown rubber.

The sole 18 includes a heel end 34 arranged where a user's heel is positioned when wearing the shoe 10 and a toe end 38 arranged opposite the heel end 34 where the user's toes are positioned when wearing the shoe 10. The sole 18 also includes a medial side 42 arranged closest to the user's center of symmetry when wearing the shoe 10 and a lateral side 46 arranged opposite the medial side 42 farther from the user's center of symmetry when wearing the shoe 10.

Turning now to FIG. 2 and FIG. 3, schematic drawings of a user's foot 50 are shown including a heel 54, toes 56, an arch 58, a medial side 60, and a lateral side 62. FIG. 2 depicts a perspective lateral side view of the bone structure of the foot 50, and FIG. 3 depicts a bottom view of the foot 50 including a plurality of regions located relative to the heel 54, toes 56, arch 58, medial side 60, and lateral side 62. A calcaneus region 66 (shown in FIG. 3) on the bottom of the foot 50 is located substantially beneath a calcaneus bone 68 (shown in FIG. 2) of the user, near the heel 54. A talus region 70 (shown in FIG. 3) on the bottom of the foot 50 is located substantially beneath a talus bone 72 (shown in FIG. 2) of the user, between the heel 54 and the arch 58. A longitudinal arch region 74 (shown in FIG. 3) on the bottom of the foot 50 is located substantially beneath a navicular bone 76, a cuboid bone 78 and cuneiform bones 80 (shown in FIG. 2) of the user, near the arch 58. A metatarsal region 82 (shown in FIG. 3) on the bottom of the foot 50 is located substantially beneath metatarsal bones 84 (shown in FIG. 2) of the user, between the arch 58 and the toes 56. A ball of the foot region 86 (shown in FIG. 3) on the bottom of the foot 50 is located substantially beneath the metatarsal-phalangeal joints 88 and sesamoids 90 (shown in FIG. 2) of the user, between the arch 58 and the toes 56 and closer to the medial side 60 than the lateral side 62. A toe region 92 (shown in FIG. 3) on the bottom of the foot 50 is located substantially beneath phalangeal bones 94 (shown in FIG. 2) of the user, near the toes 56.

When propelling himself on his feet, the user applies different amounts of pressure at different times to the various bones in each foot 50 during what is known as a gait cycle. For example, during a typical walking motion, the gait cycle begins when the user first contacts the ground with the heel 54 of his foot 50, thereby applying pressure to the calcaneus bone 68. As the user shifts his weight forward on his foot 50, he applies less pressure to the calcaneus bone 68 and begins to apply pressure to the talus bone 72, the navicular bone 76, the cuboid bone 78, and the cuneiform bones 80. As the user begins to propel himself off his foot 50, he applies less pressure to the talus bone 72, the navicular bone 76, the cuboid bone 78, and the cuneiform bones 80 and begins to apply pressure to the metatarsal bones 84. As the user propels himself forward, he applies pressure along the metatarsal bones 84 and to the metatarsal-phalangeal joints 88 and sesamoids 90. Finally, as the user begins to toe off and end contact with the ground, he applies less pressure to the metatarsal-phalangeal joints 88 and sesamoids 90 and applies pressure to the phalangeal bones 94. Finally, to toe off, the user applies pressure to the phalangeal bones 94 to propel forward. The user then lifts his foot 50 into a leg swing, and places it down in a location forward relative to where he lifted it. When the user places his foot 50 down again, he first contacts the ground with the heel 54, beginning a new cycle of the walking motion.

Many styles of forward propulsion, including many styles of walking and running, apply a gait cycle substantially similar to that described above. In some styles of forward propulsion, such as, for example, sprinting or shuffling, different amounts of pressure are applied to different portions of the foot 50 for different amounts of time. Additionally, the particular amounts of pressure applied to different portions of the foot 50 can vary from one individual to another. For example, some individuals apply more pressure to the medial side 60 than the lateral side 62 as they progress through the gait cycle. This particular application of pressure is known as pronation. In contrast, some individuals apply more pressure to the lateral side 62 than the medial side 60 as they progress through the gait cycle. This particular application of pressure is known as supination. Additionally, some individuals apply more pressure to their heels 54 when contacting the ground and some contact the ground with a portion of their feet nearer to the arch 58.

Shoes are designed to support and protect the feet of users during gait cycles to provide comfort and to promote efficient propulsion. However, due to differences between individuals in both foot anatomy and personal gait cycle style, some shoes are more comfortable and useful for some users than others. Additionally, producing a shoe configured to meet the variety of needs during all stages of the gait cycle can include producing a large number of different specialized parts which must be assembled into the shoe. Production and assembly of parts are contributing factors to the cost of the shoe. In general, a shoe having a larger number of parts is more expensive to produce than a shoe having a smaller number of parts. In view of the foregoing, it would be advantageous to provide a shoe that is comfortable and useful for a user and that is inexpensive to produce. It would also be advantageous to provide a shoe with a support arrangement that can be easily customized to meet the unique needs of various foot anatomies and individual gait styles.

SUMMARY

In accordance with one exemplary embodiment of the disclosure, there is provided an article of footwear comprising an upper, a midsole connected to the upper, and an outsole connected to the midsole. The midsole includes a lattice structure comprising a network of laths forming a plurality of cell units, the plurality of cell units arranged in a plurality of layers on the midsole. The midsole defines at least a first zone and a second zone wherein each cell unit in the first zone has a physical property that is substantially different from a cell unit in the second zone.

In accordance with another exemplary embodiment of the disclosure, there is provided an article of footwear comprising an upper, a midsole connected to the upper, and an outsole connected to the midsole. The midsole includes a monolithic lattice structure comprising a network of laths forming a plurality of cell units, the plurality of cell units arranged in a first zone and a second zone of the midsole, wherein each cell unit in the first zone has a physical property that is substantially different from a cell unit in the second zone.

In accordance with another exemplary embodiment of the disclosure, there is provided an article of footwear comprising an upper, a midsole connected to the upper, and an outsole connected to the midsole. The midsole comprises a lattice structure including a network of laths forming a plurality of cell units. The plurality of cell units include complete cell units and incomplete cell units.

In accordance with yet another exemplary embodiment of the disclosure, there is provided an article of footwear comprising an upper, a midsole connected to the upper, and an outsole connected to the midsole. The midsole includes a monolithic lattice structure comprising a network of laths forming a plurality of cell units. The outsole is connected to the midsole, the outsole including at least one opening, wherein the monolithic lattice structure is exposed through the at least one opening.

The above described features and advantages, as well as others, will become more readily apparent to those of ordinary skill in the art by reference to the following detailed description and accompanying drawings. While it would be desirable to provide an article of footwear, a midsole or a method of making an article of footwear that provides one or more of the advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 9A is a schematic drawing of a first portion portions of the lattice of FIG. 4 with partial or incomplete laths or vertices;

FIG. 9B is a schematic drawing of a second portion of the lattice of FIG. 4 with partial or incomplete laths or vertices;

FIG. 9C is a schematic drawing of a third portion of the lattice of FIG. 4 with partial or incomplete laths or vertices.

DETAILED DESCRIPTION

Figure 3:
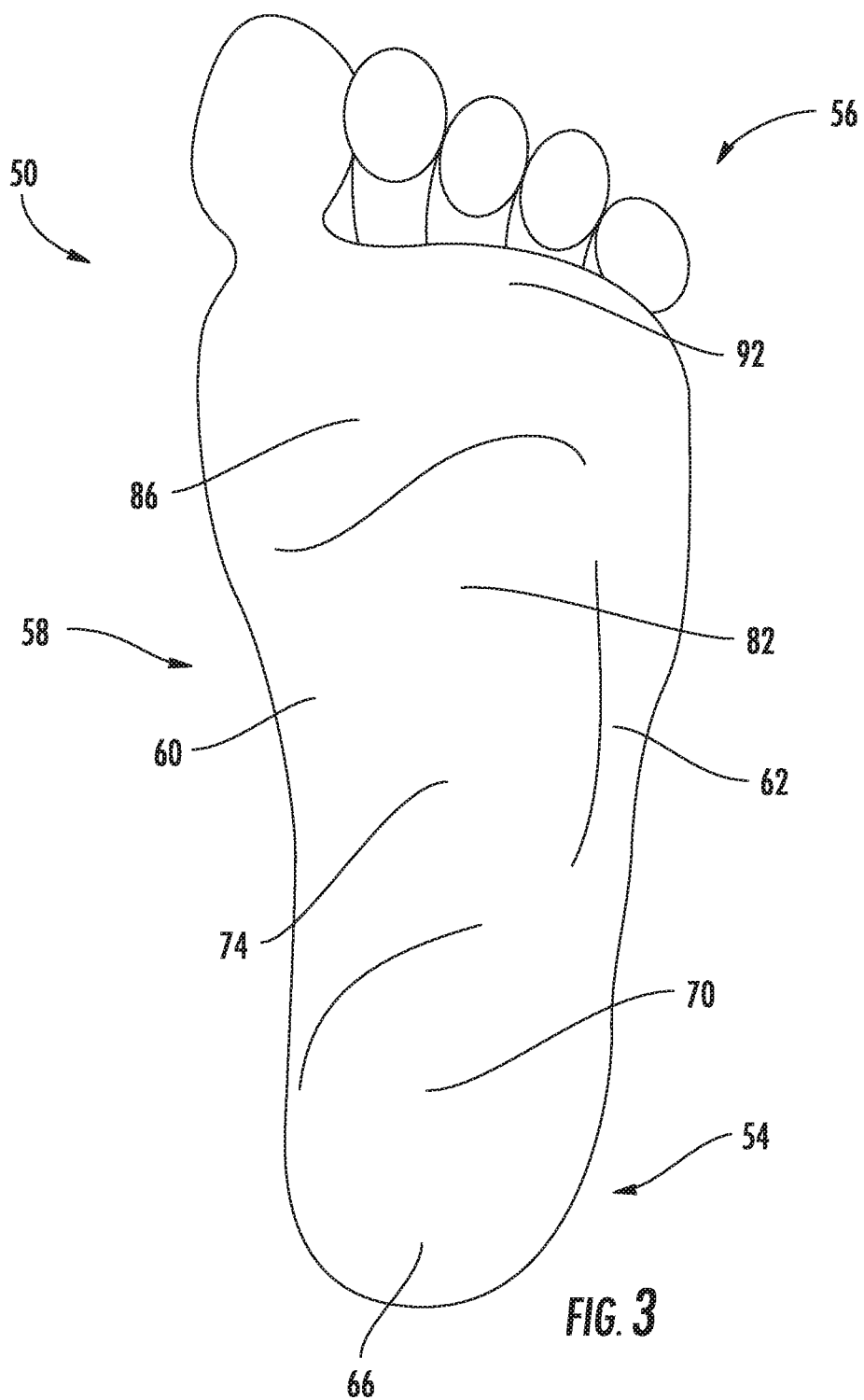
FIG. 3 is a schematic drawing of a bottom view of a foot.
Figure 4:
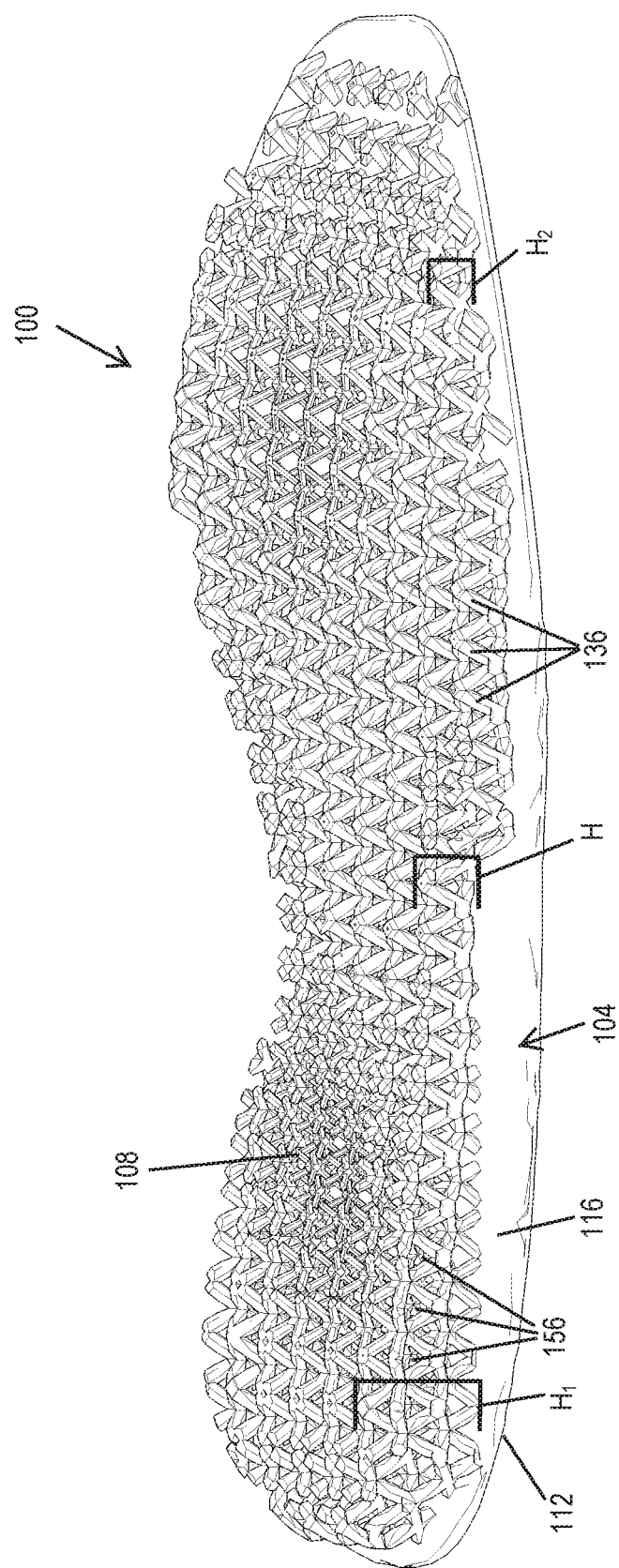
FIG. 4 is a bottom perspective view of a midsole including a platform and a lattice structure.

As shown in FIG. 4, a midsole 100 includes a platform 104 and a lattice structure or lattice 108. The platform 104 includes a first surface 112 and a second surface 116 opposite the first surface 112. The first surface 112 is configured to be oriented toward a bottom of the foot 50 (shown in FIGS. 2 and 3) of a user when the user is wearing a shoe, such as, for example, the shoe 10 shown in FIG. 1, including the midsole 100. The second surface 116 is configured to be oriented away from the bottom of the foot 50 (shown in FIGS. 2 and 3) of the user when the user is wearing a shoe, such as, for example, the shoe 10 shown in FIG. 1, including the midsole 100. The lattice 108 is integrally formed with the second surface 116 of the platform 104 and covers substantially all of the second surface 116 of the platform 104. As used herein, the phrase "integrally formed with" is intended to mean formed together of the same material so as to be inseparable parts of a whole. The platform 104 and lattice 108 are essentially comprised of, for example, a polymer such as, for example, nylon.

Figure 5:
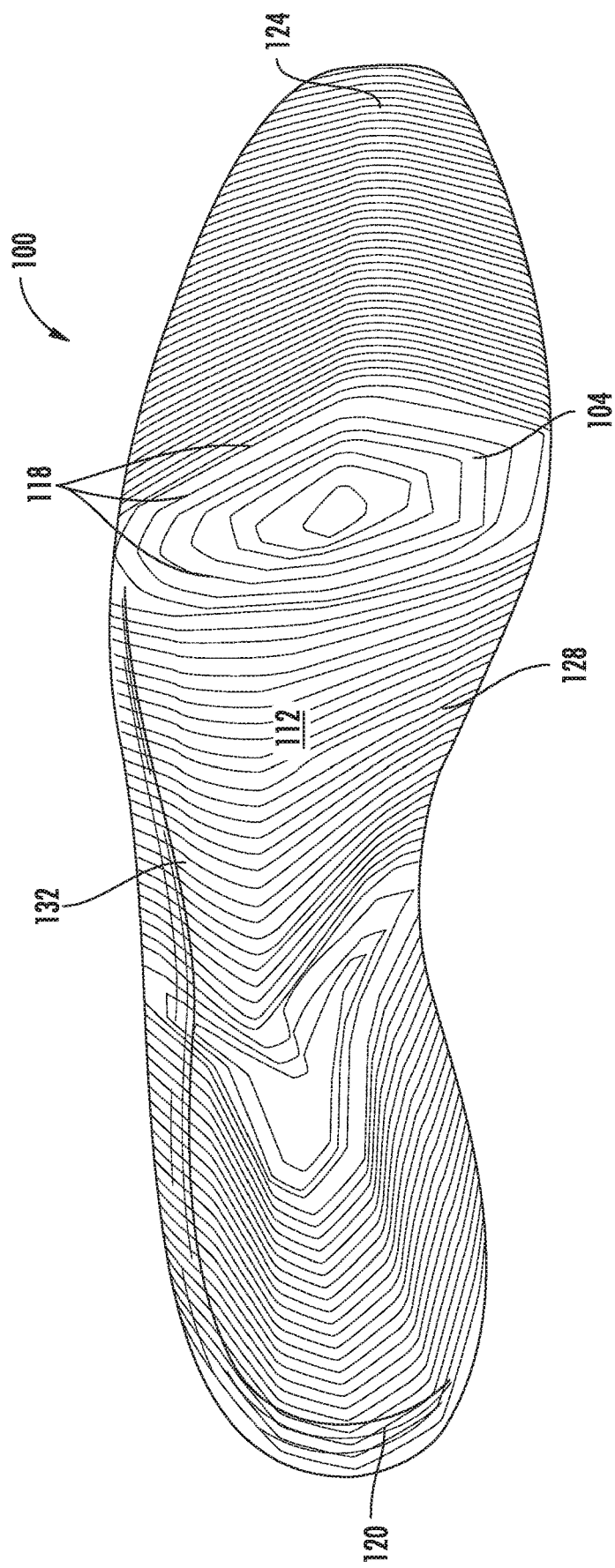
FIG. 5 is a top view of the midsole of FIG. 4.

With reference to FIG. 5, the platform 104 also includes contours 118 formed on the first surface 112 and configured to match contours of a surface of the bottom of the foot 50 (shown in FIGS. 2 and 3) of the user. The contours 118 are substantially shaped as topographic ridges formed as discreet and distinct raised levels from the first surface 112 of the platform 104. By matching the contours 118 of the surface of the bottom of the foot 50 (shown in FIGS. 2 and 3) of the user, the platform 104 is configured to receive the foot 50 (shown in FIGS. 2 and 3) in a manner that feels natural to the user and that provides enhanced support and comfort to the user.

The platform 104 also includes a heel end or heel portion 120, a toe end or toe portion 124, an arch side or medial portion 128, and an outward side or lateral portion 132. The platform 104 is configured such that when the midsole 100 is included in a shoe, such as, for example, the shoe 10 shown in FIG. 1, the heel portion 120 is positioned substantially above the heel end 34 of the sole 18 (shown in FIG. 1), the toe portion 124 is positioned substantially above the toe end 38 of the sole 18 (shown in FIG. 1), the medial portion 128 is positioned substantially above the medial side 42 of the sole 18 (shown in FIG. 1), and the lateral portion 132 is positioned substantially above the lateral side 46 of the sole 18 (shown in FIG. 1). Accordingly, when a user is wearing the shoe including the midsole 100, the heel portion 120 is arranged to support the heel 54 of the foot 50 (shown in FIGS. 2 and 3), the toe portion 124 is arranged to support the toes 56 of the foot 50 (shown in FIGS. 2 and 3), the medial portion 128 is arranged to support the medial side 60 of the foot 50 (shown in FIGS. 2 and 3), and the lateral portion 132 is arranged to support the lateral side 62 of the foot 50 (shown in FIGS. 2 and 3).

Figure 6:
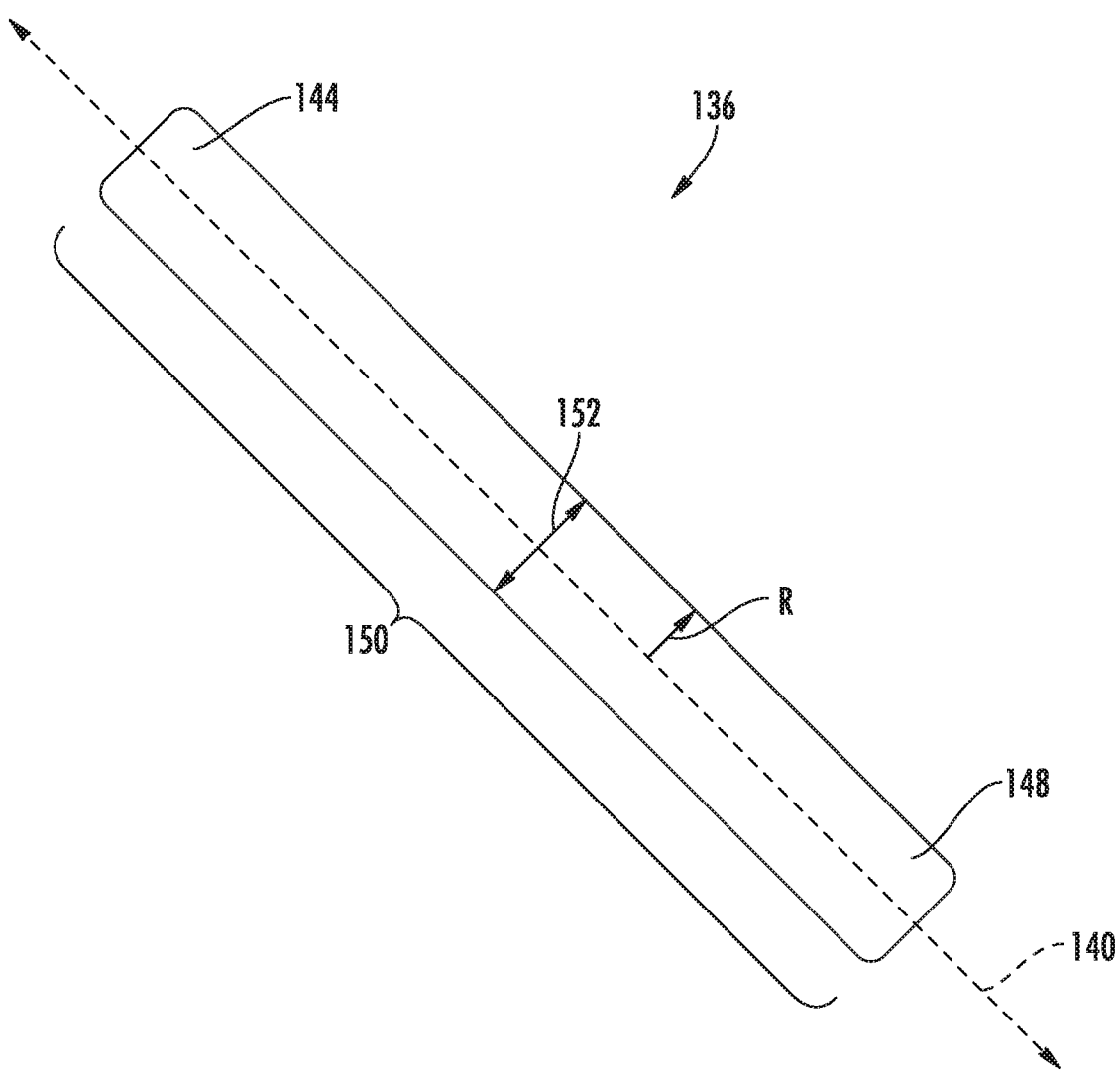
FIG. 6 is a schematic drawing of a lath of the lattice structure of FIG. 4.

Returning now to FIG. 4, the lattice 108 extends generally outwardly from the second surface 116 of the platform 104. The lattice 108 includes a plurality of laths 136. For clarity, FIG. 6 shows a schematic drawing of one lath 136 of the plurality of laths 136. The lath 136 has a substantially longitudinal structure including a longitudinal axis 140, a first end 144, and a second end 148. In the exemplary embodiment of FIG. 6, the lath 136 is substantially cylindrical in shape. The lath 136 also has a length 150 and a girth 152 that is centered about the longitudinal axis 140 and extends substantially uniformly from the first end 144 to the second end 148. The girth 152 is a measure of circumference of the lath 136. Because the lath is substantially cylindrically shaped, the girth 152 can be calculated with the radius R measured from the longitudinal axis 140 to the edge of the lath 136 in a direction perpendicular to the lath 136. The girth 152 of the lath is equal to 2×π×R. In at least one exemplary embodiment, the length 150 of the lath 136 is approximately 9 millimeters.

Figure 7:
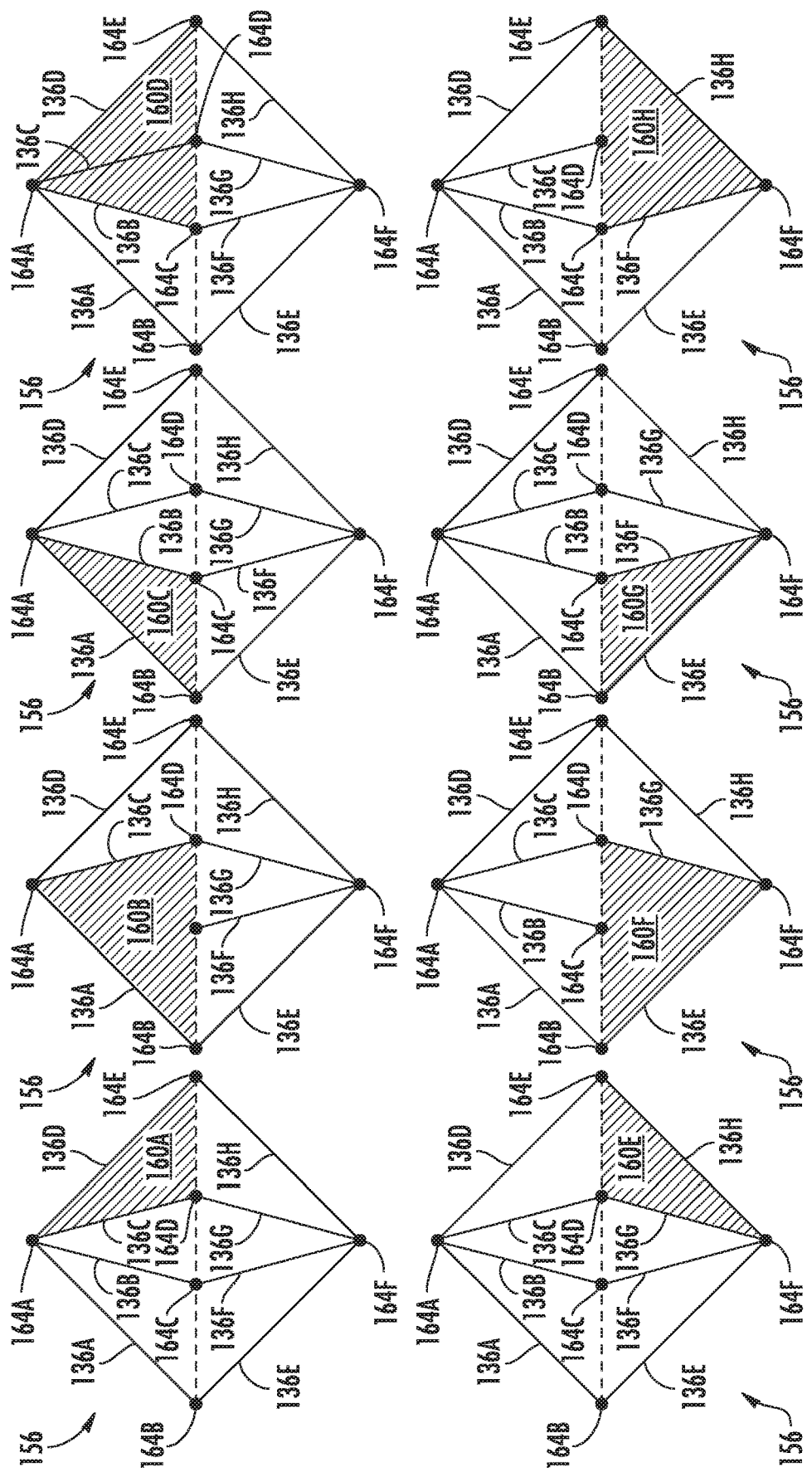
FIG. 7 is a schematic drawing of a cell unit of the lattice structure of FIG. 4.

With continued reference to FIG. 4, the lattice 108 also includes a plurality of cell units 156. For clarity, FIG. 7 shows a schematic drawing of eight views of one cell unit 156 of the plurality of cell units 156. The cell unit 156 is substantially shaped as an octahedron and is defined by eight faces 160A-160H, six vertices 164A-164F, and eight laths 136A-136H. Each of the faces 160A-160H is substantially shaped as an equilateral triangle. An octahedron has a volume determined by the length of each side. Accordingly, the volume of the cell unit 156 is determined by the length 150 of each lath. In at least one exemplary embodiment, each lath 136A-136H has a length of approximately 9 millimeters such that the cell unit 156 has a volume of approximately 0.34 centimeters cubed. So that the volume of the cell unit 156 is not altered by the girth 152 (shown in FIG. 6) of each lath 136A-136H, the volume of the cell unit 156 is measured within the boundary defined by the longitudinal axis 140 (shown in FIG. 6) of each lath 136A-136H.

With continued reference to FIG. 7, each of the six vertices 164A-164F is formed by the intersection or joining together of the first end 144 or the second end 148 (shown in FIG. 6) of at least two of the laths 136A-136H. More specifically, vertex 164A is formed by the intersection of an end of four laths: 136A, 136B, 136C and 136D. Vertex 164B is formed by the intersection of an end of two laths: 136A and 136E. Vertex 164C is formed by the intersection of an end of two laths: 136B and 136F. Vertex 164D is formed by the intersection of an end of two laths: 136C and 136G. Vertex 164E is formed by the intersection of an end of two laths: 136D and 136H. Finally, vertex 164F is formed by the intersection of an end of four laths: 136E, 136F, 136G and 136H.

Each of the faces 160A-160H is defined by an area, bound by two laths of the laths 136A-136H, within a plane defined by three adjacent vertices of the vertices 164A-164F. More specifically, the face 160A is an area, bound by laths 136C and 136D, within the plane defined by adjacent vertices 164A, 164D and 164E. The face 160B is an area, bound by laths 136A and 136C, within the plane defined by adjacent vertices 164A, 164B and 164D. The face 160C is an area, bound by laths 136A and 136B, within the plane defined by adjacent vertices 164A, 164B and 164C. The face 160D is an area, bound by laths 136B and 136D, within the plane defined by adjacent vertices 164A, 164C and 164E. The face 160E is an area, bound by laths 136G and 136H, within the plane defined by adjacent vertices 164D, 164E and 164F. The face 160F is an area, bound by laths 136E and 136G, within the plane defined by adjacent vertices 164B, 164D and 164F. The face 160G is an area, bound by laths 136E and 136F, within the plane defined by adjacent vertices 164B, 164C and 164F. Finally, the face 160H is an area, bound by laths 136F and 136H, within the plane defined by adjacent vertices 164C, 164E and 164F.

Returning to FIG. 4, the lattice 108 includes a plurality of cell units 156 arranged adjacent to one another and integrally formed with one another to construct the lattice 108 as a single unitary part. The lattice 108 forms a uniform three-dimensional pattern, and adjacent cell units 156 share laths 136 and/or vertices 164 (shown in FIG. 7) such that a single lath 136 can be shared by as many as two adjacent cell units 156, and a single vertex 164 (shown in FIG. 7) can be shared by as many as six adjacent cell units 156. Because each cell unit 156 in the pattern is substantially similar, each uniform cell unit 156 in the pattern has a substantially uniform volume.

The lattice 108 extends with a height H from the second surface 116 of the platform 104. The height H of the lattice 108 varies along the platform 104 from the heel portion 120 to the toe portion 124 and from the medial portion 128 to the lateral portion 132. For example, as shown in FIG. 4, the height $H_1$ is different than the height $H_2$.

Figure 2:
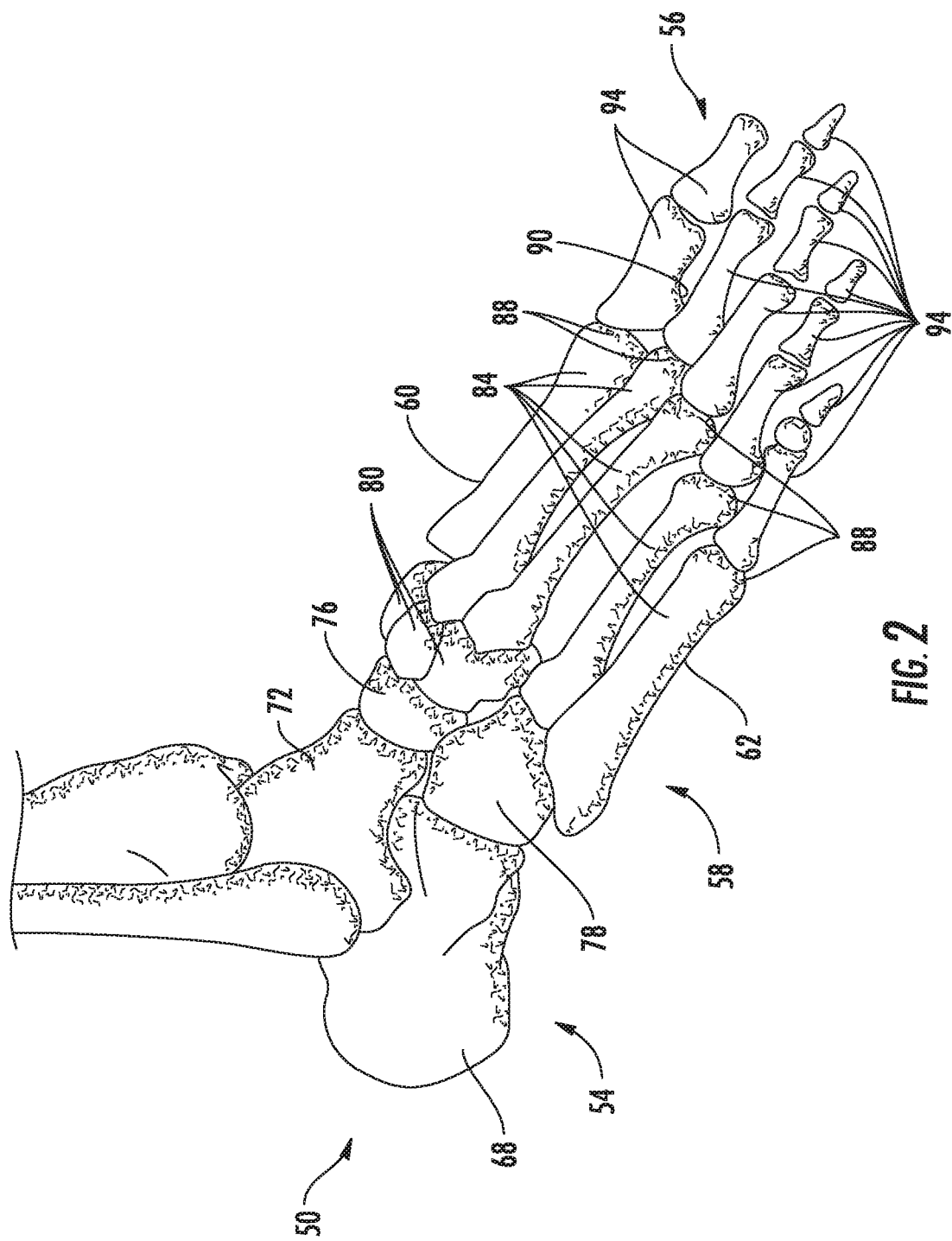
FIG. 2 is a schematic drawing of a medial side view of a bone structure of a foot.
Figure 8:
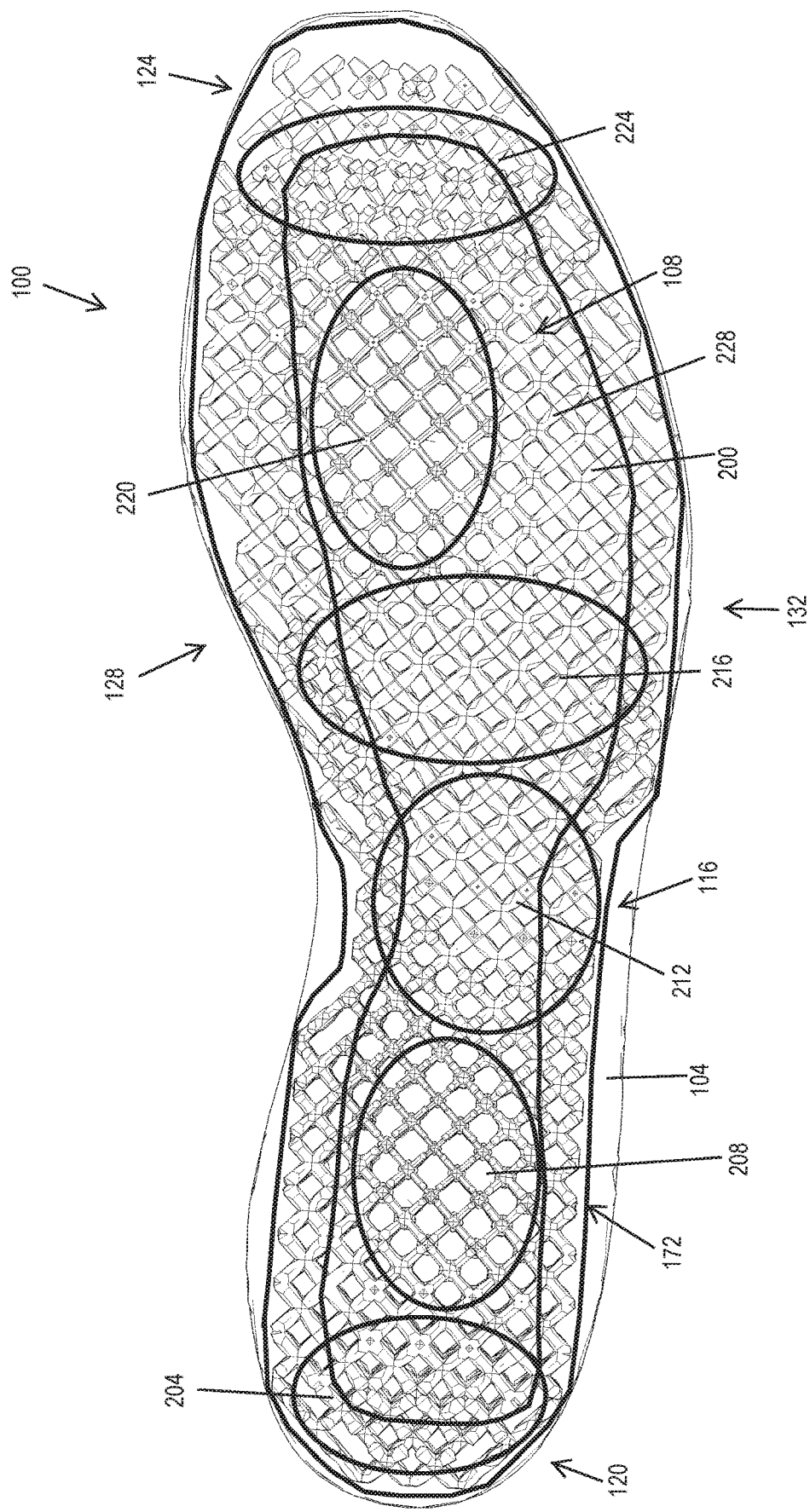
FIG. 8 is a bottom view of the midsole of FIG. 4.

As shown in FIG. 8, the platform 104 is shaped to substantially match the shape of the bottom of the foot 50 (shown in FIGS. 2 and 3). Accordingly, the platform 104 has an irregular perimeter 172. Because the lattice 108 is integrally formed with and covers substantially the entirety of the second surface 116 of the platform 104, the lattice 108 is truncated in all directions. In other words, the pattern of the lattice 108 does not extend infinitely in all three dimensions, but is limited by the height H (shown in FIG. 4) and the perimeter 172 and is truncated where it is limited by the height H (shown in FIG. 4) and the perimeter 172. Accordingly, a portion of the plurality of laths 136 (shown in FIG. 6), a portion of the plurality of vertices 164 (shown in FIG. 7), and a portion of the plurality of cell units 156 (shown in FIG. 7) in the lattice 108 are incompletely formed.

For clarity, FIGS. 9A-9C depict schematic drawings of a number of incompletely formed parts of the lattice 108. More specifically, as shown in FIG. 9B, by virtue of their position relative to the height H and abutting the perimeter 172 (shown in FIG. 8), partial or incomplete laths 176 have a length L that is shorter than the length 150 of the fully formed laths 136. Similarly, as shown in FIG. 9C, partial or incomplete vertices 180 are formed by the intersection of fewer laths 136 than the four laths 136 which intersect at fully formed vertices 164 (shown in FIG. 7). Similarly, partial or incomplete cell units 184 have fewer than eight laths 136 and/or fewer than six vertices 164. Additionally, as shown in FIG. 9A, at least some incomplete cell units 184 are formed of incomplete laths 176 and/or incomplete vertices 180. The incomplete laths 176, incomplete vertices 180, and incomplete cell units 184 are non-uniform with one another but are different as they are positioned in different locations on the lattice 108 truncated by the perimeter 172 (shown in FIG. 8) and the height H (shown in FIG. 4). Each incomplete cell unit 184 is defined by at least one vertex 164 or incomplete vertex 180 and at least two laths 136 or incomplete laths 176. Accordingly, each incomplete cell unit 184 is defined by at least two partial or incomplete faces 188 defined by an area within a plane formed by at least one vertex 164 or incomplete vertex 180 and bound by at least a portion of two laths 136 or incomplete laths 176.

Returning now to FIG. 8, the lattice 108 includes a plurality of regions or zones formed along the midsole 100 and positioned relative to the heel portion 120, the toe portion 124, the medial portion 128, and the lateral portion 132. Specifically, the lattice 108 includes a perimeter zone 200, a calcaneus zone 204, a talus zone 208, a longitudinal arch zone 212, a metatarsal zone 216, a ball of the foot zone 220, and a toe zone 224. Each zone includes complete cell units 156 (shown in FIG. 7) and incomplete cell units 184 (shown in FIGS. 9A-9C), complete laths 136 (shown in FIG. 6) and incomplete laths 176 (shown in FIGS. 9A-9C), and complete vertices 164 (shown in FIG. 7) and incomplete vertices 180 (shown in FIGS. 9A-9C) that are located within that zone of the lattice 108. In other words, the term cell unit can be used to refer to a complete cell unit and an incomplete cell unit, the term lath can be used to refer to a complete lath and an incomplete lath, the term vertex can be used to refer to a complete vertex and an incomplete vertex, and the term face can be used to refer to a complete face and an incomplete face.

The perimeter zone 200 is arranged substantially along the perimeter 172 of the platform 104 and generally extends approximately 1-20 millimeters inwardly from the perimeter 172. The calcaneus zone 204 is arranged substantially at the heel portion 120 of the platform 104 and is substantially centered between the medial portion 128 and the lateral portion 132. The talus zone 208 is arranged nearer to the toe portion 124 of the platform 104 than the calcaneus zone 204 and is substantially centered between the medial portion 128 and the lateral portion 132. The longitudinal arch zone 212 is arranged nearer to the toe portion 124 of the platform 104 than the talus zone 208 and is substantially spread across the medial portion 128 and the lateral portion 132. The metatarsal zone 216 is arranged nearer to the toe portion 124 of the platform 104 than the longitudinal arch zone 212 and is substantially spread across the medial portion 128 and the lateral portion 132. The ball of the foot zone 220 is arranged nearer to the toe portion 124 of the platform 104 than the metatarsal zone 216 and is arranged nearer to the medial portion 128 than the lateral portion 132. The toe zone 224 is arranged nearer to the toe portion 124 of the platform 104 than the ball of the foot zone 220 and is substantially spread across the medial portion 128 and the lateral portion 132.

The lattice 108 further includes transition areas 228 arranged around and between the other zones 200, 204, 208, 212, 216, 220, 224. The transition areas 228 include cell units 156 and incomplete cell units 184, laths 136 and incomplete laths 176, and vertices 164 and incomplete vertices 180 that are not located within any other of the other zones 200, 204, 208, 212, 216, 220, 224 of the lattice 108.

Figure 1:
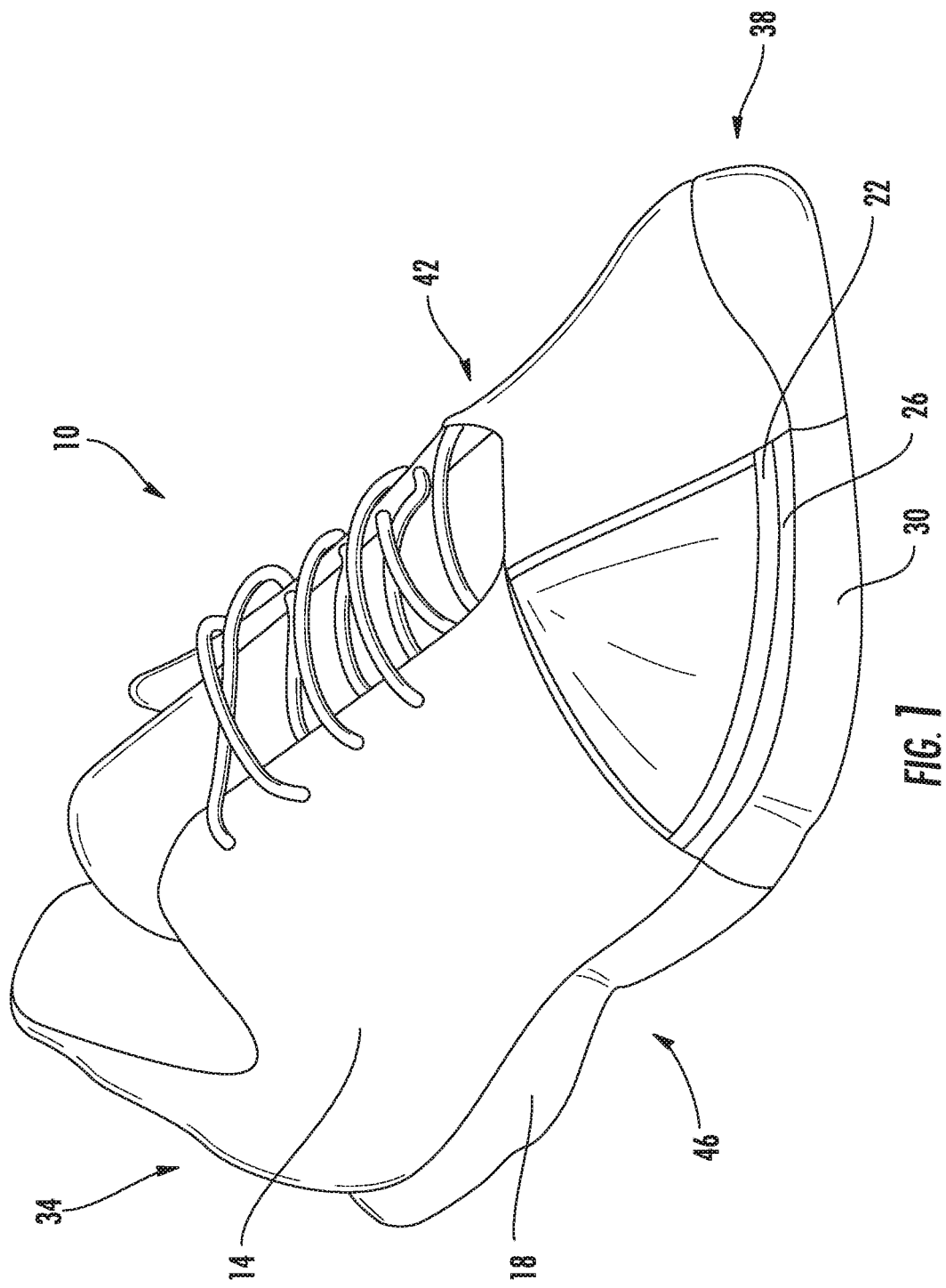
FIG. 1 is a schematic drawing of a shoe as is generally known in the prior art.

The zones 200, 204, 208, 212, 216, 220, 224 are arranged on the lattice 108 such that when the midsole 100 is included in a shoe, like the shoe 10 shown in FIG. 1, a user's foot 50 (shown in FIGS. 2 and 3) aligns with the midsole 100 and the various zones 200, 204, 208, 212, 216, 220, 224 align to support the various regions of the user's foot 50. More specifically, when a user wears the shoe 10 including the midsole 100, the bottom of the foot 50 (shown in FIGS. 2 and 3) is generally aligned within the perimeter zone 200, the calcaneus region 66 (shown in FIG. 3) generally aligns with the calcaneus zone 204, the talus region 70 (shown in FIG. 3) generally aligns with the talus zone 208, the longitudinal arch region 74 (shown in FIG. 3) generally aligns with the longitudinal arch zone 212, the metatarsal region 82 (shown in FIG. 3) generally aligns with the metatarsal zone 216, the ball of the foot region 86 (shown in FIG. 3) generally aligns with the ball of the foot zone 220, and the toe region 92 (shown in FIG. 3) generally aligns with the toe zone 224.

Because the user's foot 50 (shown in FIGS. 2 and 3) varies in shape and structure and bears different amounts of pressure in different regions during different stages of a gait cycle, to provide support and comfort to the user throughout the gait cycle, the zones 200, 204, 208, 212, 216, 220, 224 of the lattice 108 also vary in shape and structure. Additionally, the height H (shown in FIG. 4) of the lattice 108 and/or the girths 152 (shown in FIG. 6) of the laths 136 and incomplete laths 176 differ between the different zones 200, 204, 208, 212, 216, 220, 224 of the lattice 108. The height H (shown in FIG. 4) is expressible as a typical scale measurement (i.e., 4 millimeters) and is also expressible as the number of cell units 156 (shown in FIG. 7) stacked on top of one another. By way of example, laths 136 (shown in FIG. 6) and incomplete laths 176 (shown in FIGS. 9A-9C) located within the longitudinal arch zone 212 have girths 152 (shown in FIG. 6) that differ from the girths 152 of laths 136 and incomplete laths 176 located within the ball of the foot zone 220. The heights H (shown in FIG. 4) and girths 152 (shown in FIG. 6) of laths 136 and incomplete laths 176 within the transition area 228 are gradations between adjacent zones 200, 204, 208, 212, 216, 220, 224 to form smooth transitions of heights H (shown in FIG. 4) of the lattice 108 and girths 152 (shown in FIG. 6) of the laths 136 and incomplete laths 176 between the zones 200, 204, 208, 212, 216, 220, 224.

Higher heights H provide more material in the lattice 108 extending from the second surface 116 of the platform 104 which can be compressed by the foot 50 (shown in FIGS. 2 and 3) as the user applies pressure during the gait cycle. Conversely, lower heights H provide less padding and position the foot 50 closer to the ground. A gradual decrease in the height H of the lattice 108 from the heel portion 120 to the toe portion 124 of the platform 104 promotes natural rolling from the heel 54 to the toes 56 of the foot 50 during gait. Thicker girths 152 provide stiffer material in the lattice 108 which is less compressible and less springy when compressed by the foot 50 (shown in FIGS. 2 and 3) as the user applies pressure during the gait cycle. This is useful, for example, for providing stability and maintaining structure under the applied pressure. Conversely, thinner girths 152 provide softer material in the lattice 108 which is more compressible and springier when compressed by the foot 50 as the user applies pressure during the gait cycle. This is useful, for example, for providing spring when the user pushes off or removes pressure and for deforming to better absorb impact. Varying combinations of height H and girth 152 result in various amounts of padding, compressibility, softness, and stiffness which are appropriate for accommodating the foot 50 (shown in FIGS. 2 and 3) in the different zones 200, 204, 208, 212, 216, 220, 224 of the lattice 108 during different stages of the gait cycle.

More specifically, in the perimeter zone 200, the lattice 108 has a varying height H and laths 136 and incomplete laths 176 with relatively thick girths 152. The height H of the lattice 108 is higher at the heel portion 120 and lower at the toe portion 124 to promote natural rolling from the heel 54 to the toes 56 of the foot 50. The relatively thick girths 152 provide extra support to the outside of the user's foot 50 to keep the foot 50 aligned with the midsole 100. The laths 136 and incomplete laths 176 in the perimeter zone 200 have girths 152 in a range of, for example, approximately 4.5 to 5.5 millimeters.

In the calcaneus zone 204, the lattice 108 has a relatively high height H and laths 136 and incomplete laths 176 with relatively thick girths 152 to provide substantial padding with relatively stiff cushion to the calcaneus bone 68. This is useful to pad the calcaneus region 66 of the foot 50 when a user initially makes contact with the ground during gait because a force of the impact on the calcaneus bone 68 can be quite high during that event. The calcaneus zone 204 also should not be too soft so that the lattice 108 does not compress completely under the high force. The height H of the lattice 108 is, for example, two complete cell units 156 stacked on top of one another, or approximately 19 millimeters.

In the talus zone 208, the lattice 108 has a relatively high height H and laths 136 and incomplete laths 176 with relatively thin girths 152 to provide substantial padding with relatively soft cushion to the talus region 70 of the foot 50 during gait. The height H of the lattice 108 in the talus zone 208 is less than the height H of the lattice 108 in the calcaneus zone 204 to promote natural rolling from the heel 54 to the toes 56 of the foot 50. The height H is still sufficiently high to provide substantial cushion near the high force. The girths 152 are thin enough to provide softer cushioning and springiness as the user pushes off the heel 54 and begins to roll the foot 50 toward the arch 58. The laths 136 and incomplete laths 176 in the talus zone 208 have girths 152 of, for example, approximately 3 millimeters.

In the longitudinal arch zone 212, the lattice 108 has a moderate height H and laths 136 and incomplete laths 176 with relatively thick girths 152 to provide some padding with stiffer support to the longitudinal arch region 74 of the foot 50 during gait to reduce collapse of the arch 58 of the foot 50 as the user bears weight on the arch 58. The height H of the lattice 108 in the longitudinal arch zone 212 is, for example, slightly more than one cell unit 156 or approximately 14 millimeters. The laths 136 and incomplete laths 176 in the longitudinal arch zone 212 have girths 152 in a range of, for example, approximately 4.5 to 5.5 millimeters.

In the metatarsal zone 216, the lattice 108 has a moderate height H and laths 136 and incomplete laths 176 with moderately thick girths 152 to provide some padding with some support to the metatarsal region 82 of the foot 50 during gait. The height H of the lattice 108 in the metatarsal zone 216 is, for example, slightly less than the height H of the lattice 108 in the longitudinal arch zone 212 to promote natural rolling from the heel 54 to the toes 56 of the foot 50. The laths 136 and incomplete laths 176 in the metatarsal zone 216 have girths 152, for example, slightly thinner than the girths 152 of the laths 136 and incomplete laths 176 in the longitudinal arch zone 212.

In the ball of the foot zone 220, the lattice 108 has a relatively low height H and laths 136 and incomplete laths 176 with relatively thin girths 152 to provide relatively little padding with relatively soft cushion and relatively high springiness to the ball of the foot region 86 of the foot 50 during gait. The relatively low height H, compared to zones nearer to the heel portion 120 of the platform 104, promotes natural rolling from the heel 54 to the toes 56 of the foot 50 during the stages of gait by naturally guiding the foot 50 along a downward angle from the heel portion 120 toward the toe portion 124 of the platform 104. Additionally, the relatively low height H of the lattice 108 in the ball of the foot zone 220 provide less cushion than other zones because the ball of the foot region 86 of the foot 50 is naturally more padded than surrounding regions of the foot 50 and thus includes natural cushion to be compressed by the foot 50 during gait. The height H of the lattice 108 in the ball of the foot zone 220 is, for example, approximately 9 millimeters. The relatively thin girths 152 provide springiness as the user begins to push off the foot 50 during gait. The laths 136 and incomplete laths 176 in the ball of the foot zone 220 have girths 152 of, for example, approximately 3 millimeters.

In the toe zone 224, the lattice 108 has low height H and laths 136 and incomplete laths 176 with relatively thick girths 152 to provide little cushion and enough stiffness for the user to push off of during gait. The low height H promotes natural rolling toward the toes 56 of the foot 50 at the end of a gait cycle. The height H is sufficient to provide structure for the user to push off of at the end of a gait cycle. The height H of the lattice 108 in the toe zone 224 is in a range of, for example, approximately 3 to 5 millimeters. The relatively thick girths 152 also provide sufficient structure for the user to push off of at the end of a gait cycle. The laths 136 and incomplete laths 176 in the toe zone 224 have girths 152 of, for example, approximately 4.5 millimeters.

The arrangement of laths 136 and incomplete laths 176 and cell units 156 and incomplete cell units 184 within the zones 200, 204, 208, 212, 216, 220, 224 of the lattice 108 provide a midsole 100 that is able to be included in a shoe to provide comfort and utility for a user by accommodating the foot 50 during all stages of the gait cycle. The lattice 108 enables the midsole 100 to provide mechanical cushioning by deforming along the structure of the lattice 108, rather than just compressing, under the weight and applied pressure of the user. Further, the lattice 108 enables the midsole 100 to provide various types and amounts of cushioning to the various regions of the foot 50 due to differences in height H and girth 152 across the different zones 200, 204, 208, 212, 216, 220, 224 of the lattice 108. Accordingly, the midsole 100 provides three-dimensional zonal compression to a user during all stages of the gait cycle.

Figure 10:
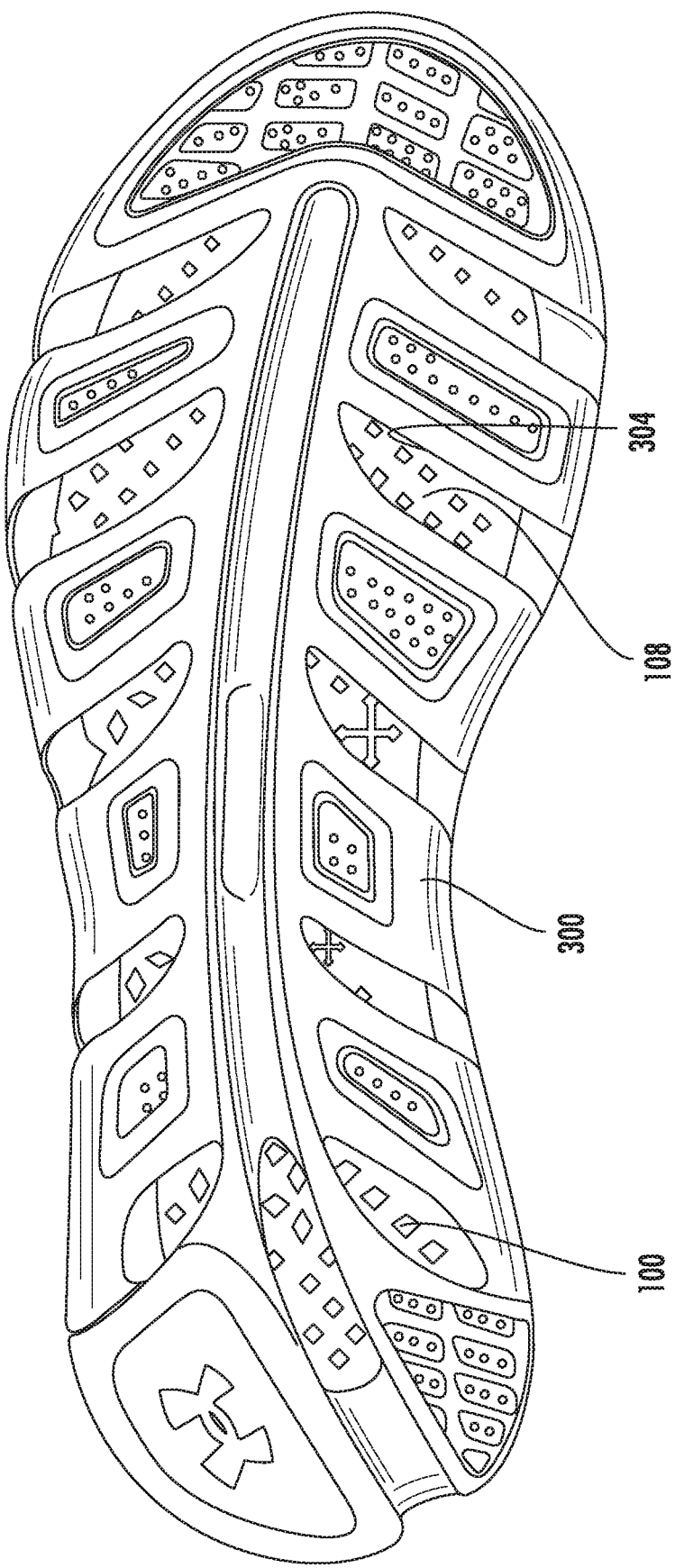
FIG. 10 is a bottom view of the midsole of FIG. 4 positioned within an outsole.

As shown in FIG. 10, in at least one exemplary embodiment, the midsole 100 is configured to be inserted into an outsole 300. By forming the midsole 100 as a single, unitary piece capable of being inserted into the outsole 300, it is possible to produce customized shoes. In the exemplary embodiment shown in FIG. 10, the midsole 100 fits tightly within the outsole 300 such that the lattice 108 is visible through openings 304 formed in the outsole 300. The openings 304 provide visual access to the midsole 100 from outside the customized shoe.

As mentioned above, the platform 104 and the lattice 108 are integrally formed, and the lattice 108 is formed as a single, unitary piece. Accordingly, the entire midsole 100 is formed as a single, unitary piece. As used herein, the term "single, unitary piece" is intended to mean an indivisible part that is not joined together after being formed and cannot be disassembled without destruction of the part. To form the three-dimensional structure of the midsole 100, including the open crisscrossing structure of the lattice 108, as a single, unitary piece must be accomplished using a highly capable manufacturing technique. More specifically, the midsole 100 is not formed using injection molding processes and the midsole 100 does not include any indications of injection molding processes, including gate marks, sprue marks, parting line marks, and ejector pin marks. In this exemplary embodiment, the midsole 100 is formed using three-dimensional printing or selective laser sintering processes.

Figure 11:
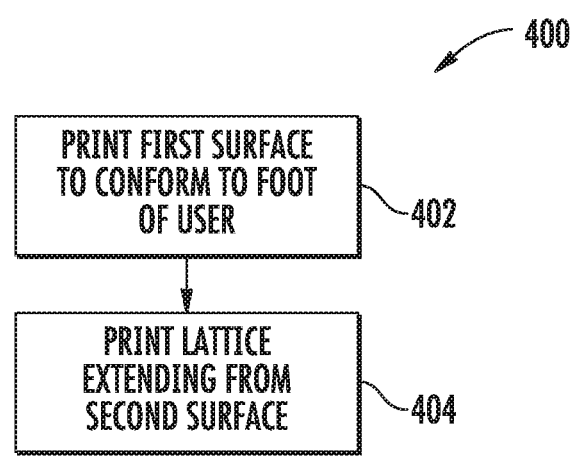
FIG. 11 is a flowchart depicting a process for forming the midsole of FIG. 4.

As is known in the art, three-dimensional printing and selective laser sintering processes are known as "additive processes" because they include progressively adding material to form the product. This is in contrast to manufacturing processes that start with a larger piece and progressively remove material to form the product. As shown in FIG. 11, the midsole 100 is formed using process 400. To form the midsole 100 using three-dimensional printing and selective laser sintering processes, the platform 104 and the lattice 108 are printed such that the first surface 112 of the platform 104 conforms to the foot 50 of the user (step 402) and the lattice 108 extends from the second surface 116 of the platform (step 404). Printing the lattice 108 includes printing the laths 136 and the incomplete laths 176 joined together at vertices 164 and incomplete vertices 180 to form cell units 156 and incomplete cell units 184. In at least one exemplary embodiment, the steps of the process are performed in reverse order. In at least one exemplary embodiment, the steps of the process are performed simultaneously.

By forming the midsole 100 with three-dimensional printing and selective laser sintering processes it is possible to form complex three-dimensional structures including undercuts and patterns of through holes, such as the crisscrossing structure of the lattice 108. Additionally, the lattice 108 and the platform 104 can be integrally formed of the same material in the same processing step. Because the midsole 100 is a single, unitary piece, the comfort and utility provided to the user can be accomplished with one piece instead of many. Accordingly, it is possible that the midsole 100 is less expensive to produce than a larger number of parts to be combined together to accomplish the same objective as the midsole 100.

Figure 12:
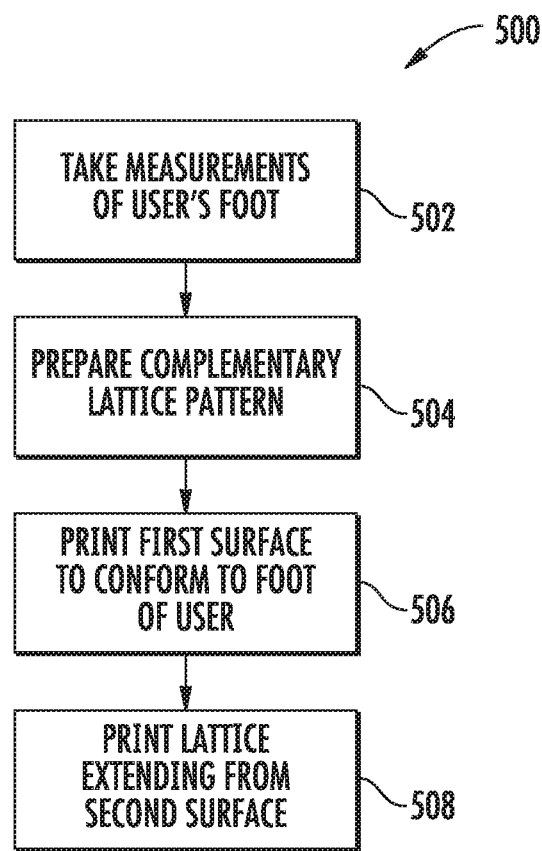
FIG. 12 is a flowchart depicting another process for forming the midsole of FIG. 4.

In at least one exemplary embodiment, the midsole 100 is specifically configured to conform to a particular user's foot. As shown in FIG. 12, the midsole 100 of this exemplary embodiment is formed using a process 500. More specifically, measurements of a user's foot are taken (step 502), including shape and size as well as force and pressure distributions along the bottom of the foot during the stages of various gait cycles. These measurements are used to prepare a pattern for a complementary lattice 108 (step 504) with properties of the zones 200, 204, 208, 212, 216, 220, 224 and properties of the laths 136 and incomplete laths 176 and cell units 156 and incomplete cell units 184 within the zones 200, 204, 208, 212, 216, 220, 224 determined by the user's individual characteristics. By way of example, if the user applies a great amount of pressure to the heel 54 of the foot 50 during initial contact with the ground during a gait cycle, the height H of the lattice 108 in the calcaneus zone 204 is increased to provide additional cushion. Similarly, by way of example, if the user's arch 58 tends to collapse inwardly while the user applies pressure during the gait cycle, the girths 152 of the laths 136 and incomplete laths 176 in the longitudinal arch zone 212 are increased to provide additional support and reduce compression. In this way, the midsole 100 is customizable and can be configured to provide custom support to the various regions of the foot 50 through each of the zones 200, 204, 208, 212, 216, 220, 224. Next the midsole 100 is formed using three-dimensional printing and selective laser sintering processes, the platform 104 and the lattice 108 are printed such that the first surface 112 of the platform 104 conforms to the foot 50 of the user (step 506) and the lattice 108 extends from the second surface 116 of the platform (step 508). Printing the lattice 108 includes printing the laths 136 and the incomplete laths 176 joined together at vertices 164 and incomplete vertices 180 to form cell units 156 and incomplete cell units 184. In at least one exemplary embodiment, steps 506 and 508 of the process are performed in reverse order. In at least one exemplary embodiment, steps 506 and 508 of the process are performed simultaneously.

What is claimed is:

1. An article of footwear comprising:
an upper;
a midsole connected to the upper, the midsole including a lattice structure comprising a network of laths forming a plurality of cell units, the plurality of cell units arranged in a plurality of layers on the midsole, the midsole defining at least a first zone and a second zone wherein each cell unit in the first zone has a physical property that is substantially different from a cell unit in the second zone, wherein the midsole is a monolithic component formed as a unitary part; and
an outsole connected to the midsole, wherein the outsole includes at least one opening such that the at least one opening in the outsole exposes the lattice structure.

2. The article of footwear of claim 1 wherein the physical property is a lath girth associated with each cell unit.

3. The article of footwear of claim 1, the midsole further comprising a platform connected to the lattice structure, the platform including a first surface configured to face a sole of a foot of a wearer and a second surface opposite the first surface.

4. The article of footwear of claim 3, wherein the lattice structure extends from a lower surface of the platform and at least two layers of cell units are arranged in a heel portion of the midsole.

5. The article of footwear of claim 3 wherein the platform extends along at least a perimeter of the lattice structure.

6. The article of footwear of claim 1 wherein the plurality of cell units include a plurality of complete cell units and a plurality of incomplete cell units, wherein the incomplete cell units include partial laths forming cell vacancies in the incomplete cell units.

7. The article of footwear of claim 1 wherein each of the plurality of cell units is defined by at least six vertices and at least eight faces.

8. The article of footwear of claim 1 wherein the lattice structure is manufactured from a polyurethane material.

9. An article of footwear comprising:
an upper;
a midsole connected to the upper, the midsole including a monolithic lattice structure comprising a network of laths forming a plurality of cell units, the plurality of cell units arranged in a first zone and a second zone of the midsole, wherein each cell unit in the first zone has a physical property that is substantially different from a cell unit in the second zone, wherein the plurality of cell units are further arranged in a repeating pattern in a plurality of layers of the midsole, and wherein the cell units in an upper layer are stacked upon the cell units in a lower layer and separated by a set of vertices common to cell units in both the upper layer and the lower layer; and
an outsole connected to the midsole.

10. The article of footwear of claim 9 wherein the physical property is a lath girth.

11. The article of footwear of claim 9 further comprising a platform extending along a perimeter portion of the midsole, the lattice structure integrally formed with the platform.

12. The article of footwear of claim 9 wherein each of the plurality of cell units have a geometry defining at least six faces.

13. The article of footwear of claim 9 wherein a geometry of the plurality of cell units is uniform along a thickness of the midsole.

14. The article of footwear of claim 9 wherein the first zone is a perimeter portion of the midsole and the second zone is a central portion of the midsole, wherein the physical property decreases from a the first zone to the second zone.

15. An article of footwear comprising:
an upper;
a midsole connected to the upper, the midsole including a monolithic lattice structure comprising a network of laths forming a plurality of cell units; wherein the plurality of cell units are further arranged in a repeating pattern in a plurality of layers of the midsole, and wherein the cell units in an upper layer are stacked upon the cell units in a lower layer and separated by a set of vertices common to cell units in both the upper layer and the lower layer; and
an outsole connected to the midsole, the outsole including at least one opening, wherein the monolithic lattice structure is exposed through the at least one opening.

16. The article of footwear of claim 15 wherein the network of laths are positioned in at least a first zone and a second zone, wherein each lath in the first zone has a girth that is substantially different from a girth of each lath in the second zone.

17. The article of footwear of claim 15, the midsole further comprising a platform extending around at least a perimeter rim portion of the monolithic lattice structure, wherein the network of laths include cylindrical laths, including a first set of cylindrical directly connected to a lower side of the platform, and a second set of cylindrical laths directly engaging an upper side of the outsole.

18. An article of footwear comprising:
an upper;
a midsole connected to the upper, the midsole including a lattice structure comprising a network of laths forming a plurality of cell units, the plurality of cell units arranged in a plurality of layers on the midsole, the midsole defining at least a first zone and a second zone wherein each cell unit in the first zone has a physical property that is substantially different from a cell unit in the second zone, wherein each of the plurality of cell units is defined by a polyhedron shape including at least four vertices with laths extending from each of the at least four vertices, wherein the plurality of cell units are arranged in a repeating pattern of cell units such that vertices defining the plurality of cell units separate the cell units in an upper layer from the cell units in a lower layer, and wherein the vertices separating the cell units in the upper layer from the cell units in the lower layer are coplanar and positioned between the platform and the outsole, the midsole further comprising a platform connected to the lattice structure, the platform including a first surface configured to face a sole of a foot of a wearer and a second surface opposite the first surface, wherein the midsole is a monolithic component formed as a unitary part; and
an outsole connected to the midsole.

19. The article of footwear of claim 18 wherein the outsole includes at least one opening exposing the lattice structure.

* * * * *